United States Patent [19]
Dobosi

[11] 3,984,121
[45] Oct. 5, 1976

[54] BOAT TRAILER

[76] Inventor: Laszlo J. Dobosi, 4317 Markwood Lane, Fairfax, Va. 22030

[22] Filed: Sept. 18, 1975

[21] Appl. No.: 614,671

[52] U.S. Cl. ............................ 280/414 R; 280/482; 280/491 A
[51] Int. Cl.² ........................................... B60P 3/10
[58] Field of Search ........ 280/414 R, 414 A, 414 B, 280/491 A, 482, 478 R; 214/505

[56] References Cited
UNITED STATES PATENTS

| | | | |
|---|---|---|---|
| 2,856,087 | 10/1958 | Steber | 214/505 X |
| 2,894,766 | 7/1959 | Habriga | 280/482 |
| 3,608,111 | 9/1971 | Herden | 280/414 A |

*Primary Examiner*—Robert R. Song
*Assistant Examiner*—John A. Pekar
*Attorney, Agent, or Firm*—Larson, Taylor and Hinds

[57] ABSTRACT

A boat trailer includes a wheeled trailer chassis for holding a boat for hauling, launching or retrieval. The wheeled chassis is moveable, by means of rack and pinion gears, relative to a frame member secured to a towing vehicle, for launching and retrieval of a boat. Movement of the wheeled chassis is achieved by actuation of a crank or the like mounted on the moving chassis. The operator thus moves with the boat for ready access between the boat and trailer during boat launching or retrieval.

6 Claims, 8 Drawing Figures

BOAT TRAILER

BACKGROUND OF THE INVENTION

This invention relates to boat trailers.

While there are several boat trailers available, each has one or more drawbacks, particularly in those trailers for handling relatively heavy boats such as inboard/outboard boats which can be quite heavy. Various designs have been made to facilitate handling of heavier boats such as roller supports, tiltable trailers, and the like. Roller supports contact the boat hull over a small area and thus inherently are more prone to cause hull damage than a pad support which can contact the boat hull over virtually any desired area. Tilting trailer beds, as well as rollers, are also inherently expensive.

Irrespective of the design used, one problem inherent in the handling of heavy boats on present trailers is the substantial amount of physical strength required for boat handling, particularly boat retrieval. While attempts have been made in the past to meet this problem, such attempts have resulted in complex designs which are either expensive or fragile or both.

It is an object of the present invention to provide a boat trailer capable of easily handling relatively heavy boats, such as inboard/outboard boats. It is a further object to provide such a trailer which is inexpensive and robust.

BRIEF SUMMARY OF THE INVENTION

The foregoing and other objects which will be apparent to those of ordinary skill in the art are achieved according to the present invention by providing a boat trailer including an elongate, unitary wheeled trailer chassis substantially symmetrical about a longitudinal axis and including a first elongate frame member extending lengthwise of the trailer in the direction in which the trailer moves, the tubular frame member being tubular, having a forward end and a rear end, and being located substantially at the longitudinal axis of the wheeled trailer chassis, a second elongate frame member telescopically slidable within the first frame member between a withdrawn position in which a substantial portion of the length of the second frame member is located within said first frame member and in which a minor, forward, portion of the second frame member extends forwardly of the forward end of the first frame member, and an extended position in which a larger portion of the second frame member extends forwardly of the forward end of the first frame member, means for securing the forward portion of the second frame member to a towing vehicle for moving the trailer, boat support means attached to the first frame member for supporting a boat on the trailer, means for releasably securing the second frame member in its withdrawn position, means for releasably securing the second frame member in its extended position, means adjacent the forward end of the first frame member for securing a boat in a forward position on the first frame member with the forward end of a boat adjacent the boat securing means, a rack gear extending longitudinally along a surface of the second frame member, a pinion gear mounted for rotation on the first frame member in enagement with the rack gear, and means mounted on the first frame member for rotation of the pinion gear for moving the first frame member relative to the second frame member between a boat storage position in which the second frame member is in the withdrawn position and a boat launching or retrieving position in which the second frame member is in the extended position, the pinion gear rotation means moving with the first frame member.

DETAILED DESCRIPTION OF PREFERRED EMBODIMENTS

The invention will be more fully understood after reference to the following description of a preferred embodiment read in conjunction with the drawings in which.

Figure 1:
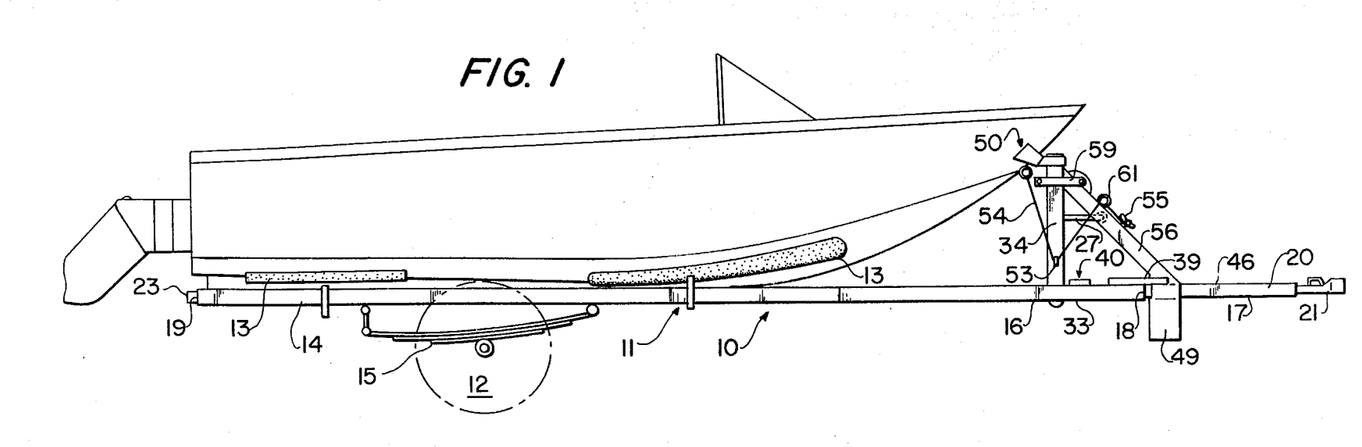
FIG. 1 is a side elevation view of a boat trailer in accordance with the invention showing a boat in stored position on the trailer but omitting the wheels and fenders for clarity.
Figure 2:
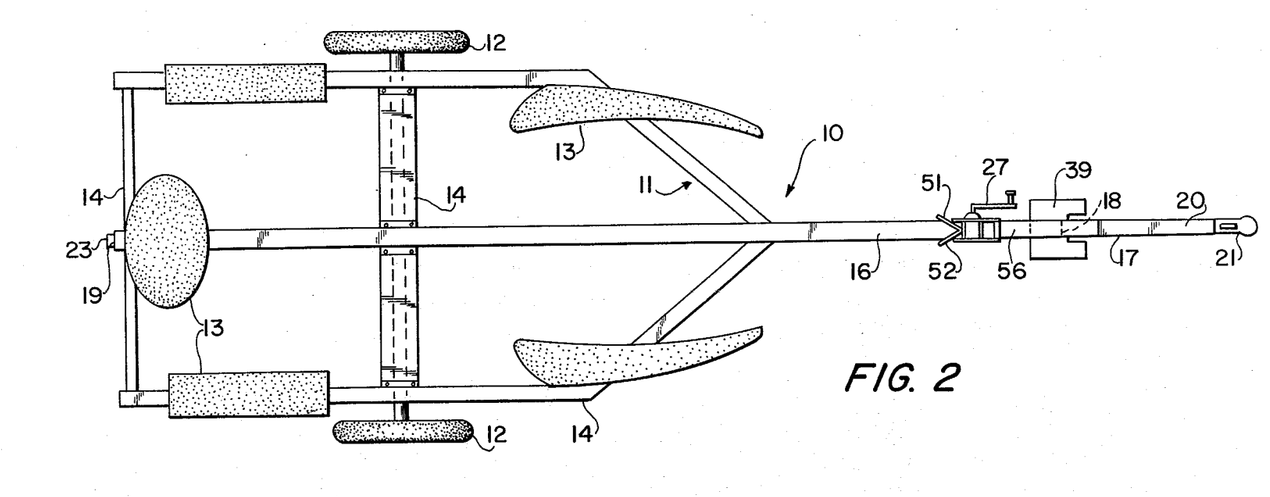
FIG. 2 is a top view of the trailer of FIG. 1 but omitting fenders and the boat shown in FIG. 1 for clarity.

Referring first to FIGS. 1 and 2, a boat trailer 10 according to the invention includes an elongate, unitary, wheeled trailer chassis 11 which includes conventional wheels 12, boat support pads 13, framing 14 and leaf springs 15. With the exception of two centrally located telescoping frame members 16, 17, and related equipment to be described below, the wheeled chassis can include conventional structural features and materials and can be fabricated in conventional manner. For example, while it is preferred to utilize pads to support a boat on the trailer, rollers or a combination of rollers and pads may be used. Pads alone, however, are preferred. In addition to lower cost, pads intrinsically result in less hull damage and provide better frictional resistance to relative movement between boat and trailer which is a significant safety factor in the event of sudden changes in speed or direction. The framing is preferably simple as shown but a tilting carriage can easily be accommodated on the basic chassis. Again, however, it is preferred to use a fixed, non-tilting frame of sufficiently robust construction for boats of a suitable weight range but otherwise as simple and as lightweight as possible to minimize initial cost and operating expenses.

Wheeled chassis 11 is generally symmetrical about its longitudinal axis and includes a first, elongate frame member 16 extending lengthwise of the trailer in the direction in which the trailer moves. Frame member 16 is tubular in cross section (FIG. 5) and includes a forward end 18 and a rear end 19. Frame member 16 is located substantially midway between wheels 12 substantially at the longitudinal axis of the trailer and the trailer is substantially symmetrical on either side of the frame member.

The trailer includes a second, elongate frame member 17 extending lengthwise of the trailer in the direction in which the trailer moves. Frame member 17 is telescopically slidable within tubular frame member 16 between a withdrawn position (FIG. 3) in which a substantial portion of its length is located within frame member 16 and in which a minor, forward portion 20 of frame member 17 extends forward of forward end 18 of frame member 16 and an extended position (FIG. 4) in which a longer portion of frame member 17 is forward of forward end 18 of frame member 16.

Figures 4, 4A:
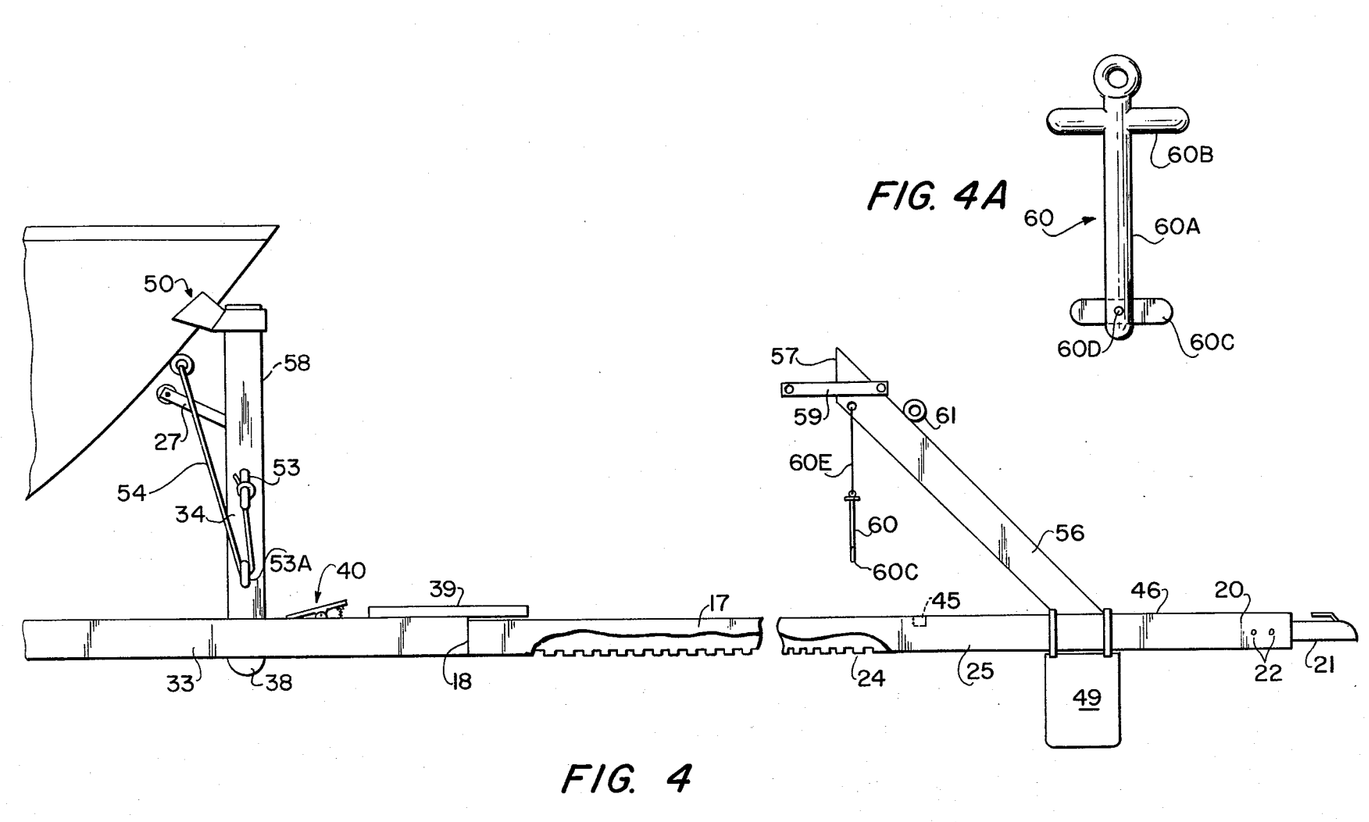
FIG. 4 is an enlarged side elevation view similar to FIG. 3 but showing the trailer in its extended boat launching or retrieving position.
FIG. 4A is an enlarged view of a pin member shown in FIG. 4.

A conventional trailer hitch member 21 is secured within a hollow forward end portion of frame member 17 by means of bolts 22 (FIG. 4). Trailer hitch member 21 is part of a conventional ball type trailer hitch and its position is preferably adjustable, lengthwise, within frame member 17 by means of bolts 22.

Figure 3:
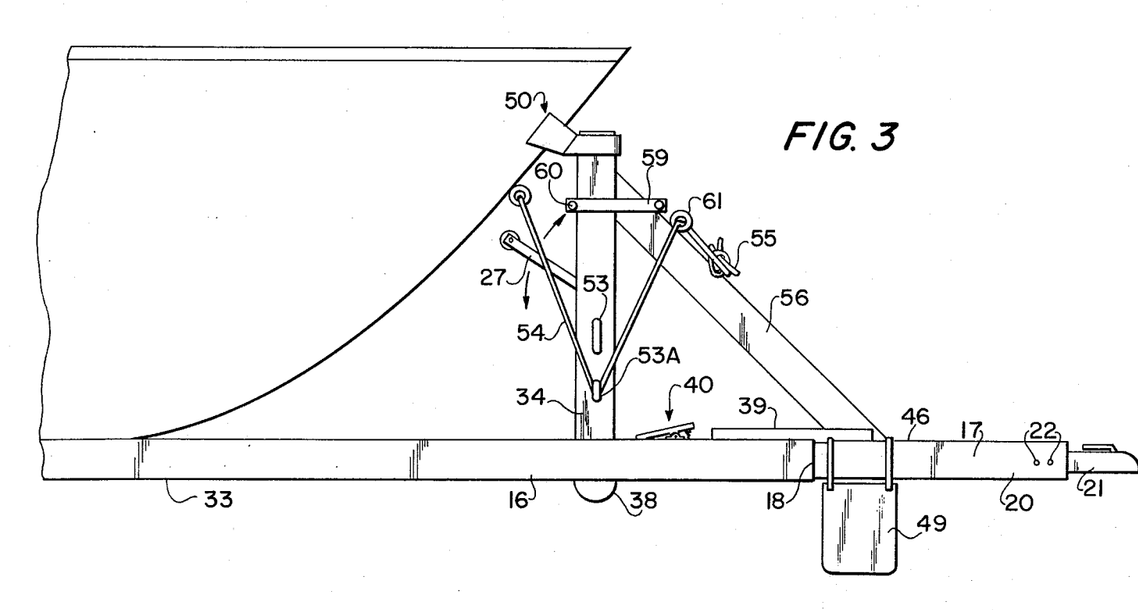
FIG. 3 is an enlarged side elevation view of the forward portion of the trailer of FIG. 1.

It will be seen from the foregoing, and in particular with reference to FIGS. 3 and 4, that a boat in stored position on the trailer is moveable with tubular frame member 16. The trailer is preferably sized to the boat such that the boat is properly balanced on the trailer. Normally, the boat is positioned such that about ten percent of the gross weight of the trailer and boat is exerted at rest at the trailer hitch. As tubular frame member 16 is moved rearwardly relative to frame member 17, the boat moves rearwardly with wheeled chassis 11 and remains in its balanced position on the trailer.

The length to which member 16 can be moved rearwardly from its forwardmost position (FIG. 1) depends on the length of frame member 17. More precisely, it depends on the length that a rack gear (to be described below) on member 17 extends rearwardly of a pinion gear (to be discussed below) on member 16. In any event, member 17 as shown has a rear end 23 terminating just to the rear of rear end 19 of member 16 when member 16 is in its most forward position. The extent to which member 16 may extend relative to member 17 depends entirely on the structural design of the trailer. For example, a trailer with heavy, robust telescoping members used to carry a light boat can be extended much further than a trailer with lightly constructed telescoping members used to carry a heavy boat. In general, however, the rearward motion of tubular frame member 16 should be limited such that in its rearward most position, at least about five percent to twenty-five percent of the length of tubular frame member 16 should overlap elongate frame member 17.

Frame member 17 can be of any convenient length and may be longer or shorter than frame member 16. The amount by which member 16 may be extended for launching or retrieving a boat is determined by the length of member 17 and by the amount of overlap required between members 16 and 17 at full extension. Ordinarily, the rear end 23 of frame member 17 terminates at or near the rear end of member 16 when the frame members are in the withdrawn position as illustrated in FIG. 1. However, frame member 17 can be much longer and can protrude to any desirable length rearward to provide any desired degree of rearward extensibility of frame member 16 relative to frame member 17. The length of member 16 can also vary considerably. It will be appreciated that wheeled trailer chassis 11 is integral with frame member 16. Therefore, it is preferred that tubular member 16 extend substantially the entire length of the wheeled trailer chassis so as to form a convenient supporting frame member to which the various chassis sub-assemblies, such as wheels, springs, axles, boat support members, and frame members may be directly or indirectly secured.

Figure 5:
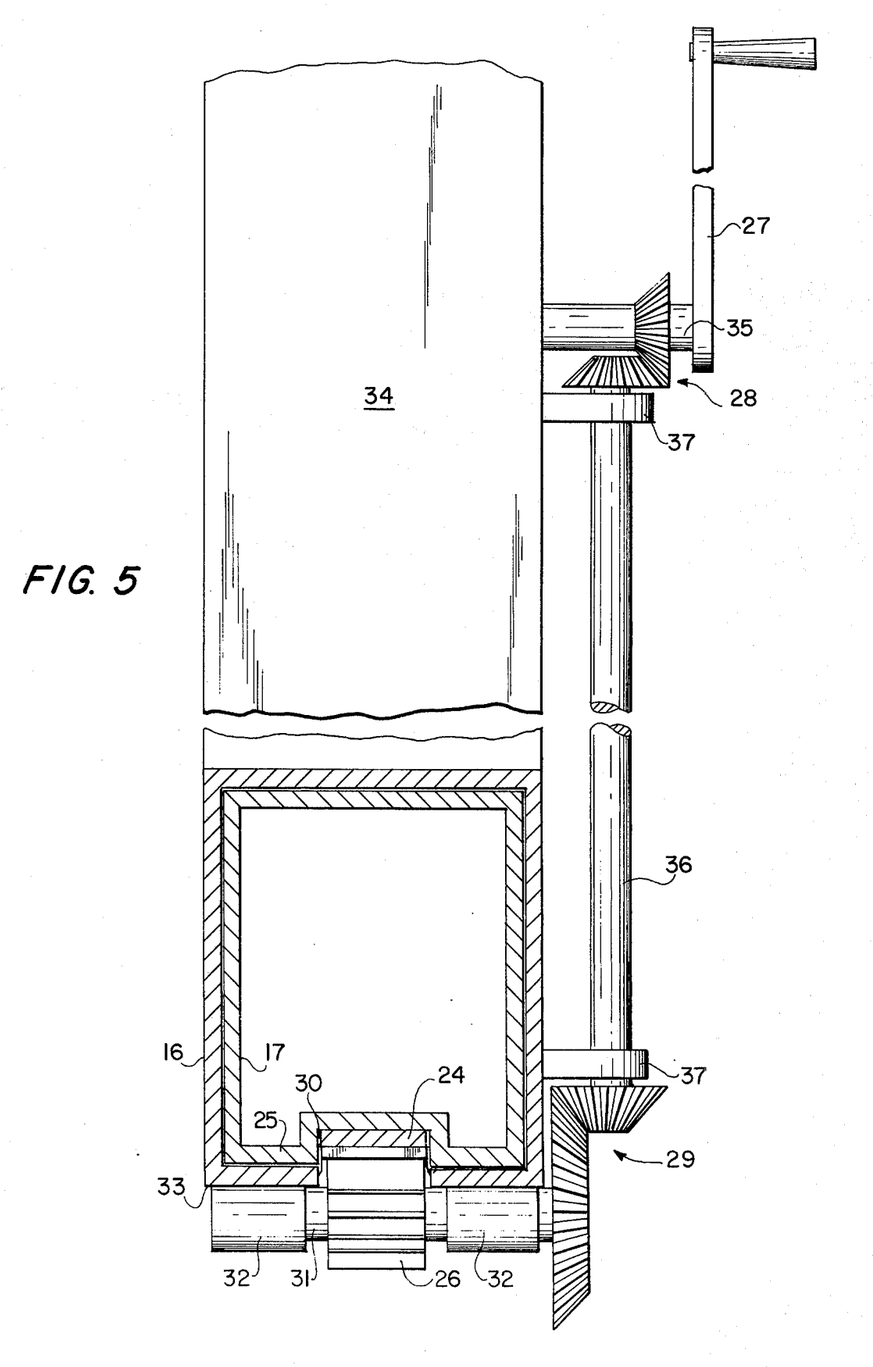
FIG. 5 is an enlarged side elevation view, partly in section, of a portion of the trailer of FIG. 1.
Figure 6:
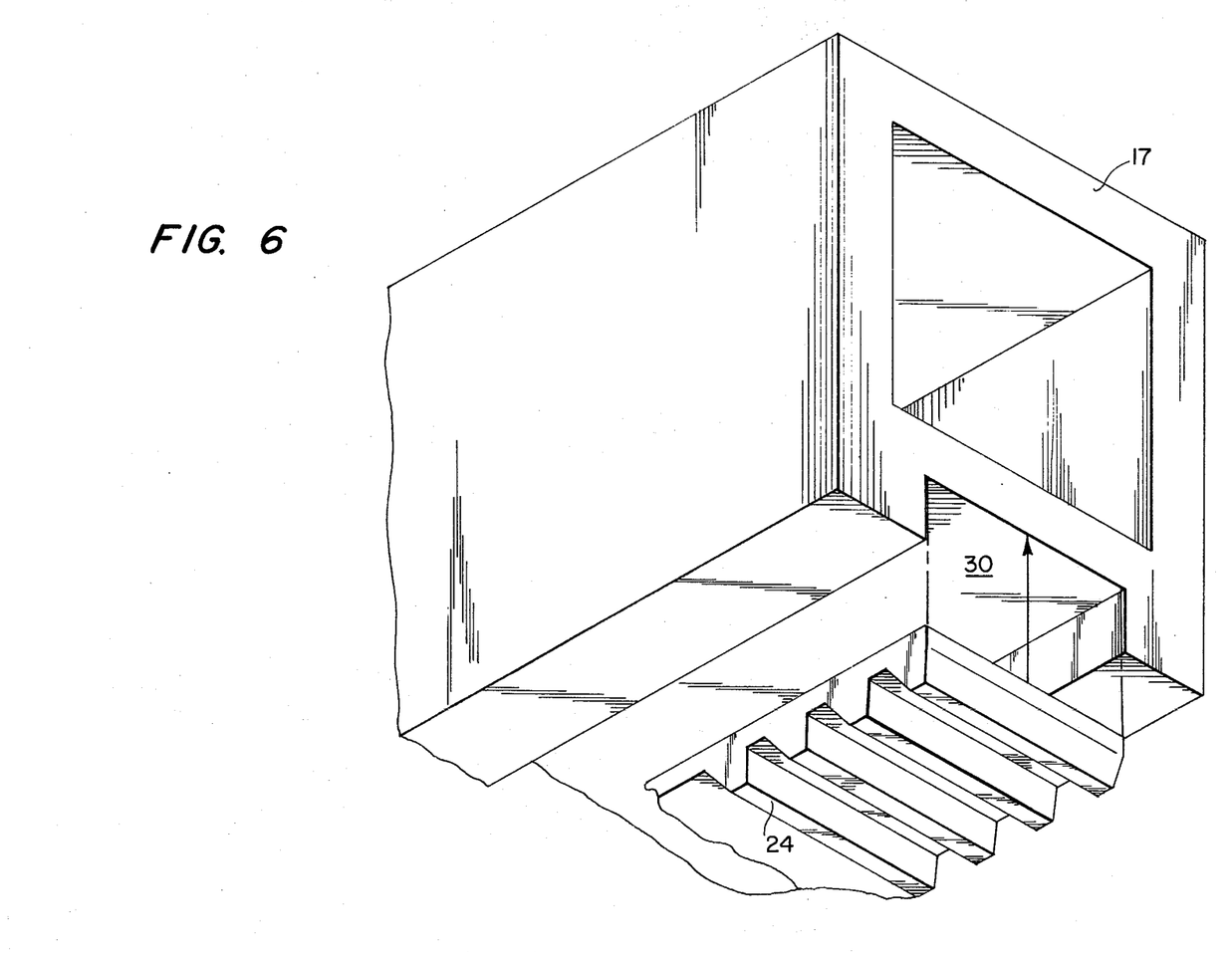
FIG. 6 is an enlarged exploded perspective view of a portion of a frame member of the device of FIGS. 1–5.

With reference to FIG. 5, frame member 17, which may be tubular as shown, is a sliding fit within frame member 16. The telescoping members are protected from corrosion by periodic application of a suitably heavy grease. If desired, corrosion resistant materials may be used. In any event, a heavy lubricant will ordinarily be used and the ends, at least the opening of the forward end 18 of frame member 16 may be flared outwardly to minimize removal of lubricant from the surfaces of member 17.

Frame members 16 and 17 are moved relative to one another to extend and withdraw wheeled trailer chassis 11 relative to a towing vehicle to which the trailer is secured by means of a rack gear 24 provided on the bottom surface 25 of frame member 17 and a pinion gear 26 actuated by a crank handle 27 through first and second sets of bevel gears 28, 29. Rack 24 may be machined into bottom surface 25 of frame member 17. Preferably, however, as shown, the rack is a separate member permanently fixed, such as by welding, or releasably fixed, such as by bolts, to bottom surface 25 of frame member 17. For this purpose, the lower surface 25 of frame member 17 is provided with an elongate recess or channel 30 to receive rack 24. While rack 24 may conveniently extend the whole length of member 17, it need only extend over the length it is desired to move member 16. For example, with frame members 16 and 17 in the fully withdrawn positions illustrated in FIG. 1, rack gear teeth provided forward of pinion gear 26 would be unnecessary. Similarly, gear teeth rearward of the point at which minimum overlap of frame members 16 and 17 occurs would be unnecessary. Of course, such rack gear teeth would be useful to dismantle the frame members and may facilitate fabrication.

As best seen in FIG. 5, pinion gear 26 is journaled for rotation on shaft 31 in two bearings 32 secured to lower surface 33 of tubular frame member 16 with the axis of shaft 31 transverse to the length of elongate rack gear 24. It will be apparent that actuation of pinion gear 26 will cause the entire wheeled trailer chassis 12 to move relative to a tractor to which the trailer is secured. By suitable selection of drive gear ratios, the trailer, with a boat on the trailer in a stored position as shown in FIG. 1, can be easily moved for launching or retrieving. The drive can be manual, as shown, or motorized. In either event, the drive for the gears is preferably mounted on the wheeled trailer chassis and thus moves therewith.

In the illustrated embodiment, the drive for pinion gear 26 is mounted on an upstanding frame member 34 welded to the upper surface of frame member 17. The drive includes crank handle 27 secured to crank shaft 35 on which is secured one of a first set of bevel gears 28. The second beveled gear of set 28 is mounted at the top end of a vertical shaft 36 journaled for rotation in bearings 37 secured to a side of member 34. A bevel gear of second set 29 is mounted on the bottom end of shaft 36 for rotation therewith and the second bevel gear of second set 28 is secured to shaft 31 to drive pinion gear 26. In the illustrated embodiment, the gear ratio of set 28 is 1:1, set 29 is 1:2 ½, and the ratio of the diameter of pinion gear 26 to the effective diameter of second bevel gear of set 29 is 1:2. Accordingly, the overall mechanical advantage from the illustrated gearing is 5:1 plus the advantage gained from the length of crank handle 27. A gear housing 38 secured to frame members 16 and 34 encloses the bevel gears, pinion gear, and drive shafts. Housing 38 preferably includes grease fittings (not shown) for proper lubrication of the bearings and gears. Pinion gear 26 acts through an opening provided in the bottom of frame member 16 and is lubricated by lubricant applied to rack 24.

Frame member 16 is also provided, at its forward end, with a platform 39 on which an operator may stand for actuation of crank handle 27 for launching or retrieval of a boat. Platform 39 is located forward of a boat properly positioned on the trailer and is preferably located forward of upstanding member 34 such that while facing rearwards, an operator standing comfortably on platform 39 may actuate crank handle 27. The arrangement on the illustrated embodiment thus facilitates operation by a right handed operator. For easy left-handed operation, the crank handle can be mounted on the left side of member 34 and crank handle 27 may be releasably secured to crank shaft 35 for this purpose. In that event, crank shaft 35 would extend through member 34 and include means for releasably securing crank lever 27 in the left hand end, looking aft, of crank shaft 35.

A boat abutment member 50 (FIG. 1) comprising rearwardly outwardly extending cheek walls 51, 52 is provided on upstanding frame member 34 adjacent its upper end with walls 51, 52 flaring outwardly to engage the bow portion of a boat in stored position on the trailer. The inner surfaces of wall members 51 and 52 are provided with resilient material to prevent damage to the boat and device 50 serves, generally, to prevent lateral motion of the bow of a stored boat. Frame member 34 is conveniently provided with a tie down cleat 53 and a fairlead 53A for guiding a tie down 54 to a tie down cleat 55.

Figure 3A:
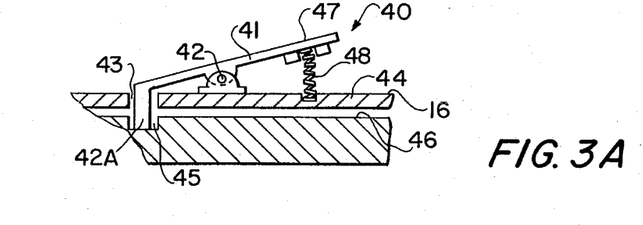
FIG. 3a is an enlarged side elevation view, partially in section, showing a detail of FIG. 3.

Frame member 16 is also provided with a latch device 40 to releasably secure frame members 16 and 17 in their withdrawn and extended positions. Latch device 40 includes a latch member 41 (FIG. 3A) pivotably mounted on pivot 42 secured to the upper surface of frame member 16. Latch member 41 is generally elongate and includes a depending latch portion 42A at its rear portion which passes through aperture 43 in the upper surface 44 of member 16 to engage in cavity 45 in upper surface 46 of member 17. Forward portion 47 of member 41 is biased upwardly by spring 48 to bias latch 42 into the catch in frame member 17 formed by cavity 45. A second cavity (not shown) is provided towards the rear of member 17 at a position to secure frame members 16 and 17 in their extended position when engaged by latch portion 42 of member 41. Latch device 40 is preferably located towards the front of member 16 at a position to be actuated by an operator located in position to actuate crank 27. In the illustrated embodiment, the forward portion 47 of member 41 forms a treadle easily actuated by an operator facing rearwards standing on platform 39. Thus, latch device 40 is located just to the rear of platform 39. It will be understood that latch member 42 engages in cavity 45 to releasably secure frame members 16 and 17 in their withdrawn position and that the same member 42 engages in another cavity to releasably secure the frame members in their extended position. Of course, if desired, separate latching members may be provided on frame member 17. Similarly, one or more latch members may be mounted on frame member 17 to engage catches provided on the frame member 16.

A stop member 56 (FIG. 3) is secured to upper surface 46 of frame member 17 and extends upwardly and rearwardly thereof in the plane of the longitudinal trailer axis. Member 56 includes a rearwardly facing surface 57 at its upper end which engages an abutting, forwardly facing, surface 58 on frame member 34 for engageably supporting frame member 34 when frame member 16 is in its forwardmost (withdrawn) position and forming with member 34 a support for a boat stored on the trailer. Member 56 includes a pair of rearwardly extending arms 59 which extend just to the rear of frame member 34 when it abuts frame member 56. A releasable pin 60 is used to releasably secure arm 59 to frame member 34. The pin (FIG. 4A) includes an elongate body portion 60A, a fixed transverse portion 60B at one end and a pivotable portion 60C at its remote end. Portion 60C is pivotable about 60D from a transverse, securing position shown in FIG. 4A, to an elongate position as shown in FIG. 4. One or more guide fairleads 61 can be provided on member 56 to guide tie down rope 54 to cleat 55.

Operation of the illustrated trailer is as follows. The trailer with a boat in the stored position shown in FIG. 1 with frame members 16 and 17 secured in the withdrawn position is backed down a sloping boat launching surface such as a boat launching ramp or a naturally sloping beach. The trailer is backed as far as desired such that the towing vehicle is in good position to be driven away from the boat ramp either with or without a boat positioned on the trailer. Normally, the wheels of the trailer will be submerged to a considerable extent when the trailer is in this position ready for launching and the stern of the boat will be partially submerged.

Any tie downs, including tie down 54, are removed. Tie down 54 is conveniently then secured to cleat 53 (FIG. 4). Frame members 56 and 34 are disengaged by removing pin 60 extending through arms 59. Pin 60 preferably includes a short length of chain or the like 60E attached at one end to the pin with the other end secured to member 56 to prevent loss. The boat is now ready for launching.

An operator stands on platform 39 facing rearwardly either straddling member 56 if it is sufficiently low or to one side if member 56 is high. In the latter event, platform 39 can be positioned to one side of member 16 rather than symmetrical as shown. The operator then actuates crank handle 27 to cause frame member 16 to move rearwardly with respect to the towing vehicle. Crank handle 27 is preferably positioned on frame member 34 at a position to be actuated comfortably by an adult operator standing on platform 39. The various guide members 53 and 61, cleats 53A and 55, arms 59, pin 60, and any other equipment associated with frame members 56 and 34 is positioned so as not to interfere with or hinder actuation of crank handle 27.

Actuation of crank handle 27 counter clockwise in the sense of FIG. 1 rotates pinion 26 which causes frame member 16 to extend or move to the left in the sense of FIG. 1. It will be understood that the entire wheeled chassis 11, including the boat, frame member 34 and platform 39 carrying the operator will move together and that the operator can assume a generally fixed position near the bow of the boat as it is being launched. As indicated above, the extent to which the trailer can be extended, that is, the extent that a stored boat can be moved for launching while on the trailer, can be determined as desired by, for example, the length of rack 24. In any event, the trailer is preferably sized to extend sufficiently such that a properly sized boat, launched from a conventional boat launching ramp, is substantially afloat when the trailer is in its extended position with the bow of the boat adjacent abutment member 50. If desired, the degree of extensibility with respect to the towing vehicle can be augmented such as by increasing the length of frame member 16 forward of frame member 34, or by increasing the rack length. Moreover, if desired, trailer hitch member 21 may be adjustable lengthwise to a substantial extent within the forward end of frame member 17. In that event, and if the extra extension is desirable for a launching operation, it is preferred to first fix trailer hitch 21 in its extended position and subsequently extend frame member 16 for launching. For hauling a boat on the trailer, the trailer hitch would be placed in the withdrawn position.

When the boat is sufficiently floated for launching, the operator can remain on platform 39 and simply step up onto the boat for easy launching. Tie down 54 is, of course, released from cleat 53A for launching. If the bow is high, one or more steps can be provided on the trailer, for example on frame member 34 to facilitate entry into the boat.

The trailer bed is preferably of the non-tilting type with non-roller supports as shown and these relatively expensive features can be avoided in the present invention. Roller supports, in addition, are inherently more harmful to the boat hull. However, it will be understood that the wheeled trailer chassis 11 could be provided with one or more rollers, a tilting frame, or the like.

Retrieval of a boat is performed in substantially the reverse order. If desired, retrieval can be facilitated by a winch mounted on the trailer frame in any convenient place such as on frame members 34 or 56. In any event, the bow of the boat is brought into abutment with member 50 and secured there by ropes 54 or the like. Crank handle 27 is then actuated clockwise in the sense of FIG. 1 by an operator on platform 39 to bring the wheeled trailer chassis and boat into the stored position. It will be noted that once the bow of a boat engages member 50, an operator of the boat can simply walk forward and step down onto platform 39 for operation of crank 27. Boat retrieval is completed by securing the wheeled trailer chassis 11 in its withdrawn position, hauling the trailer up the slope launching surface by means of the towing vehicle, and making any desired adjustments in the trailer hitch before hauling the trailer on a highway. The latter operation may be hydraulically or mechanically assisted, such as by rack and pinion.

What is claimed is:

1. A trailer for transporting, launching and retrieving a boat comprising:
    an elongate, unitary wheeled trailer chassis substantially symmetrical about a longitudinal axis and including a first elongate frame member extending lengthwise of the trailer in the direction in which the trailer moves, said elongate frame member being tubular, having a forward end and a rear end, and being located substantially at the longitudinal axis of said wheeled trailer chassis;
    a second elongate frame member telescopically slidable within said first frame member between a withdrawn position in which a substantial portion of the length of said second frame member is located within said first frame member and in which a minor, forward, portion of said second frame member extends forwardly of the forward end of said first frame member, and an extended position in which a larger portion of said second frame member extends forwardly of the forward end of said first frame member;
    means for securing said forward portion of said second frame member to a towing vehicle for moving said trailer;
    boat support means attached to said first frame member for supporting a boat on said trailer;
    means for releasably securing said second frame member in its withdrawn position;
    means for releasably securing said second frame member in its extended position;
    means adjacent the forward end of said first frame member for securing a boat in a forward position on said first frame member with the forward end of a boat adjacent said boat securing means;
    a rack gear extending longitudinally along a surface of said second frame member;
    a pinion gear mounted for rotation on said first frame member in engagement with said rack gear; and
    means mounted on said first member for rotation of said pinion gear for moving said first frame member relative to said second frame member between a boat storage position in which said second frame member is in said withdrawn position and a boat launching or retrieving position in which said second frame member is in said extended position, said pinion gear rotation means moving with said first frame member;
    said trailer further including platform means secured to said first frame member and positioned such that an operator on said platform is in position adjacent said pinion gear rotation means, said platform means moving with said first member and with a boat supported thereon.

2. A trailer according to claim 1 wherein said means for releasably securing said second frame member in its withdrawn position and said means for releasably securing said second frame member in its extended position comprise a latch member mounted on said first frame member and engageable with a first catch on said second frame member to secure said second frame member in its withdrawn position and a second catch on said second frame member to secure said second frame member in its extended position, means for biasing said latch member to engage said first and second catches, and means for disengaging said latch member from said first and second catch members, said disengaging means being mounted on the forward portion of said first frame member for actuation by an operator in position on said platform for actuation of said manually operated member.

3. A trailer for transporting, launching and retrieving a boat comprising:
    an elongate, unitary wheeled trailer chassis substantially symmetrical about a longitudinal axis and including a first elongate frame member extending lengthwise of the trailer in the direction in which the trailer moves, said elongate frame member being tubular, having a forward end and a rear end, and being located substantially at the longitudinal axis of said wheeled trailer chassis;
    a second elongate frame member telescopically slidable within said first frame member between a withdrawn position in which a substantial portion of the length of said second frame member is located within said first frame member an in which a minor, forward, portion of said second frame member extends forwardly of the forward end of said first frame member, and an extended position in which a larger portion of said second frame member extends forwardly of the forward end of said first frame member;

means for securing said forward portion of said second frame member to a towing vehicle for moving said trailer;

boat support means attached to said first frame member for supporting a boat on said trailer;

means for releasably securing said second frame member in its withdrawn position;

means for releasably securing said second frame member in its extended position;

means adjacent the forward end of said first frame member for securing a boat in a forward position on said first frame member with the forward end of a boat adjacent said boat securing means;

a rack gear extending longitudinally along a surface of said second frame member;

a pinion gear mounted for rotation on said first frame member in engagement with said rack gear; and means mounted on said first frame member for rotation of said pinion gear for moving said first frame member relative to said second frame member between a boat storage position in which said second frame member is in said withdrawn position and a boat launching or retrieving position in which said second frame member is in said extended position, said pinion gear rotation means moving with said first frame member;

said boat securing means comprising a further frame member secured to said first frame member and upstanding adjacent the forward end thereof and a boat abuttment member adjacent the upper end of said upstanding frame member for abuttingly engaging a forward end of a boat in a forward position on said first frame member;

said pinion gear rotation means comprising a crank handle mounted for rotation on said upstanding frame member about a horizontal axis and operatively connected to said pinion gear through two sets of bevel gears mounted on said upstanding frame member.

4. A trailer for transporting, launching and retrieving a boat comprising:

an elongate, unitary wheeled trailer chassis substantially symmetrical about a longitudinal axis and including a first elongate frame member extending lengthwise of the trailer in the direction in which the trailer moves, said elongate frame member being tubular, having a forward end and a rear end, and being located substantially at the longitudinal axis of said wheeled trailer chassis;

a second elongate frame member telescopically slidable within said first frame member between a withdrawn position in which a substantial portion of the length of said second frame member is located within said first frame member and in which a minor, forward, portion of said second frame member extends forwardly of the forward end of said first frame member, and an extended position in which a larger portion of said second frame member extends forwardly of the forward end of said first frame member;

means for securing said forward portion of said second frame member to a towing vehicle for moving said trailer;

boat support means attached to said first frame member for supporting a boat on said trailer;

means for releasably securing said second frame member in its withdrawn position; means for releasably securing said second frame member in its extended position;

means adjacent the forward end of said first frame member for securing a boat in a forward position on said first frame member with the forward end of a boat adjacent said boat securing means;

a rack gear extending longitudinally along a surface of said second frame member;

a pinion gear mounted for rotation on said first frame member in engagement with said rack gear; and means mounted on said first frame member for rotation of said pinion gear for moving said first frame member relative to said second frame member between a boat storage position in which said second frame member is in said withdrawn position and a boat launching or retrieving position in which said second frame member is in said extended position, said pinion gear rotation means moving with said first frame member;

said boat securing means comprising a further frame member secured to said first frame member and upstanding adjacent the forward end thereof and a boat abuttment member adjacent the upper end of said upstanding frame member for abuttingly engaging a forward end of a boat in a forward position on said first frame member;

said trailer further including a stop member secured to said forward portion of said second frame member and extending upwardly and rearwardly thereof, said stop member including a rearwardly facing surface engageable with a forwardly facing surface of said upstanding frame member for engageably supporting said upstanding frame member when said second frame member is in said withdrawn position, and means for releasably securing said stop member in engagement with said upstanding frame member.

5. A trailer according to claim 4 further including means mounted on said stop member for releasably attaching a flexible boat tie down member and guide means mounted on said upstanding frame member for guiding said flexible boat tie down member downwardly from a forward location on a boat located in said forward position to said releasable attaching means.

6. A trailer for transporting, launching and retrieving a boat comprising:

an elongate, unitary wheeled trailer chassis substantially symmetrical about a longitudinal axis and including a first elongate frame member extending lengthwise of the trailer in the direction in which the trailer moves, said elongate frame member being tubular, having a forward end and a rear end, and being located substantially at the longitudinal axis of said wheeled trailer chassis;

a second elongate frame member telescopically slidable within said first frame member between a withdrawn position in which a substantial portion of the length of said second frame member is located within said first frame member and in which a minor, forward, portion of said second frame member extends forwardly of the forward end of said first frame member, and an extended position in which a larger portion of said second frame member extends forwardly of the forward end of said first frame member;

means for securing said forward portion of said second frame member to a towing vehicle for moving said trailer;

boat support means attached to said first frame member for supporting a boat on said trailer;

means for releasably securing said second frame member in its withdrawn position;

means for releasably securing said second frame member in its extended position;

means adjacent the forward end of said first frame member for securing a boat in a forward position on said first frame member with the forward end of a boat adjacent said boat securing means;

a rack gear extending longitudinally along a surface of said second frame member;

a pinion gear mounted for rotation on said first frame member in engagement with said rack gear;

means mounted on said first frame member for rotation of said pinion gear for moving said first frame member relative to said second frame member between a boat storage position in which said second frame member is in said withdrawn position and a boat launching or retrieving position in which said second frame member is in said extended position, said pinion gear rotation means moving with said first frame member;

said rack gear being located along a bottom surface of said second frame member and comprising a separate rack member secured to the bottom surface of said second frame member; the bottom surface of said second frame member including means defining an elongate channel disposed lengthwise of the second frame member in which said rack member is secured.

* * * * *